(No Model.) 3 Sheets—Sheet 2.
G. ROTH.
CAN FILLING MACHINE.
No. 505,005. Patented Sept. 12, 1893.
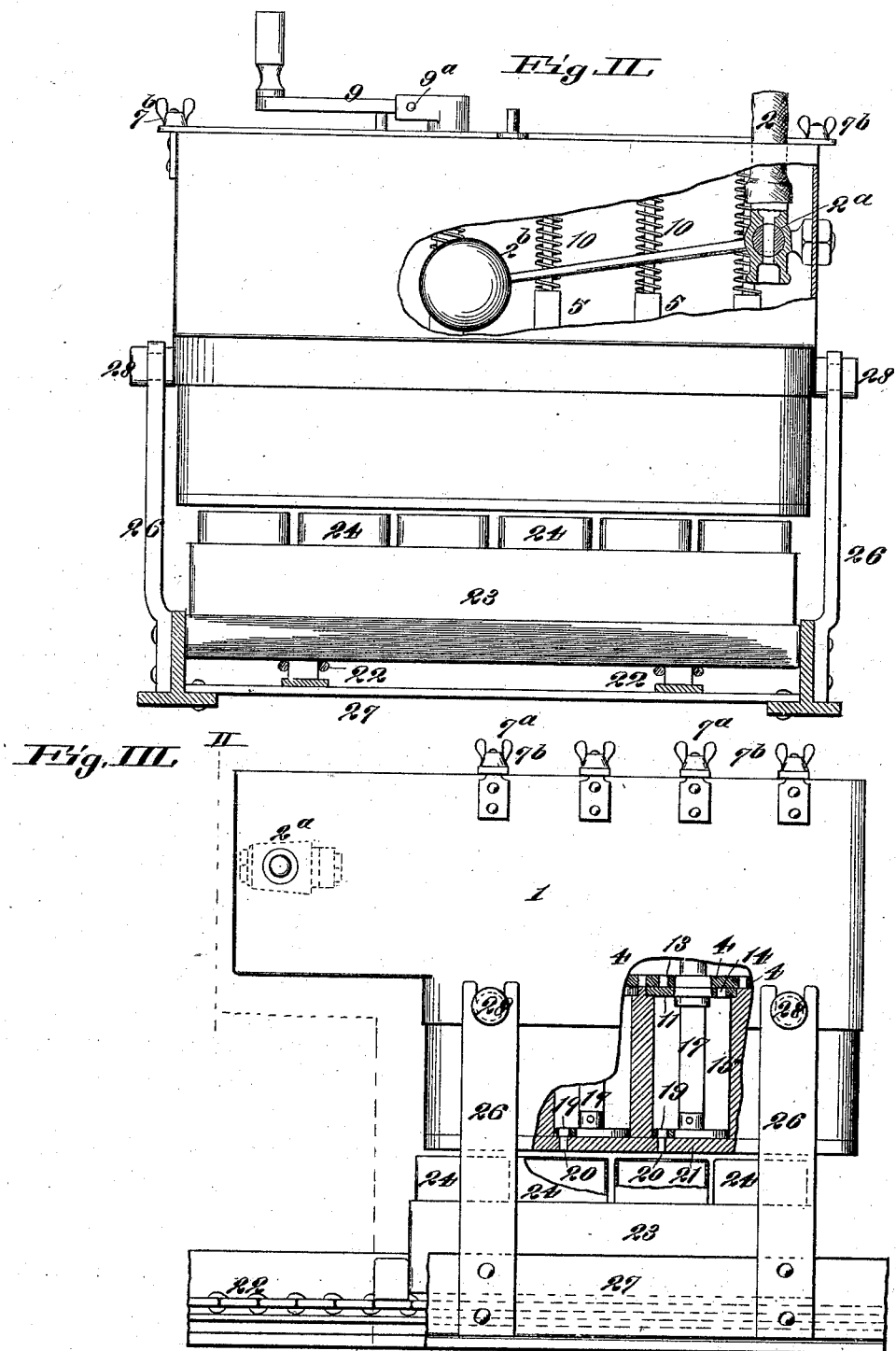
Fig. II.
Fig. III.
Attest:
A. M. Ebersole
Benj. A. Knight
Inventor:
George Roth
By Knight Bro's
Att'ys (No Model.)　　　　　　　　　　　　　　3 Sheets—Sheet 3.
G. ROTH.
CAN FILLING MACHINE.
No. 505,005.　　　　　　　　Patented Sept. 12, 1893.
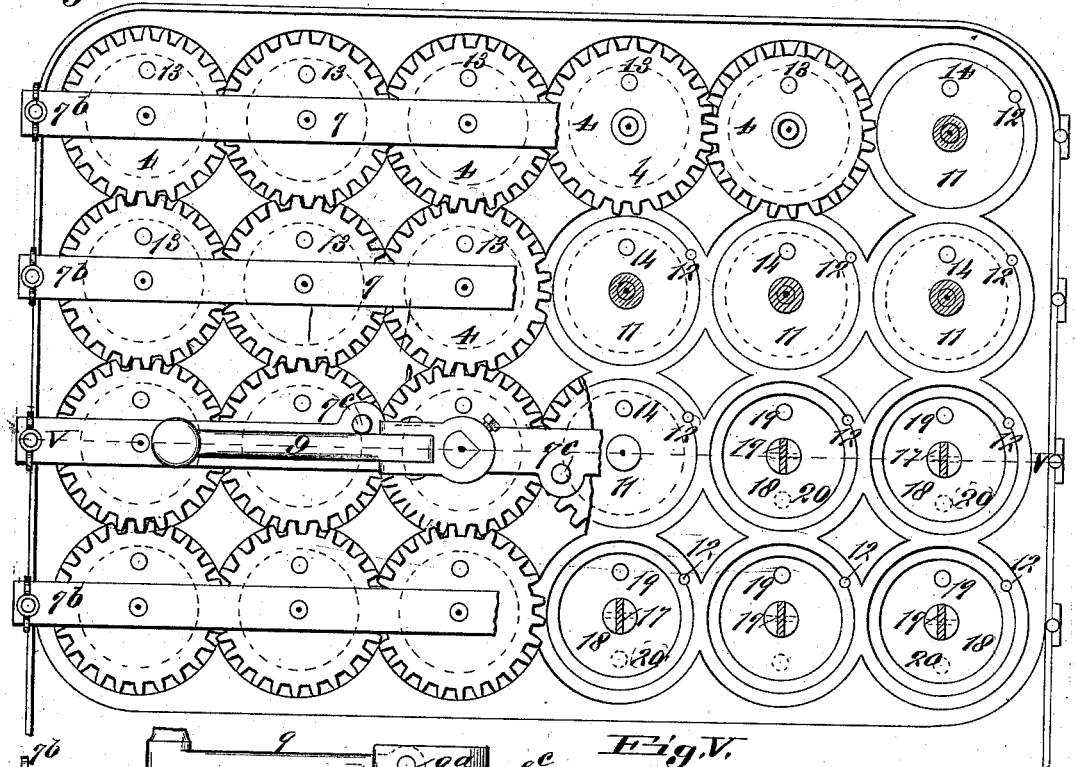
Fig. IV.
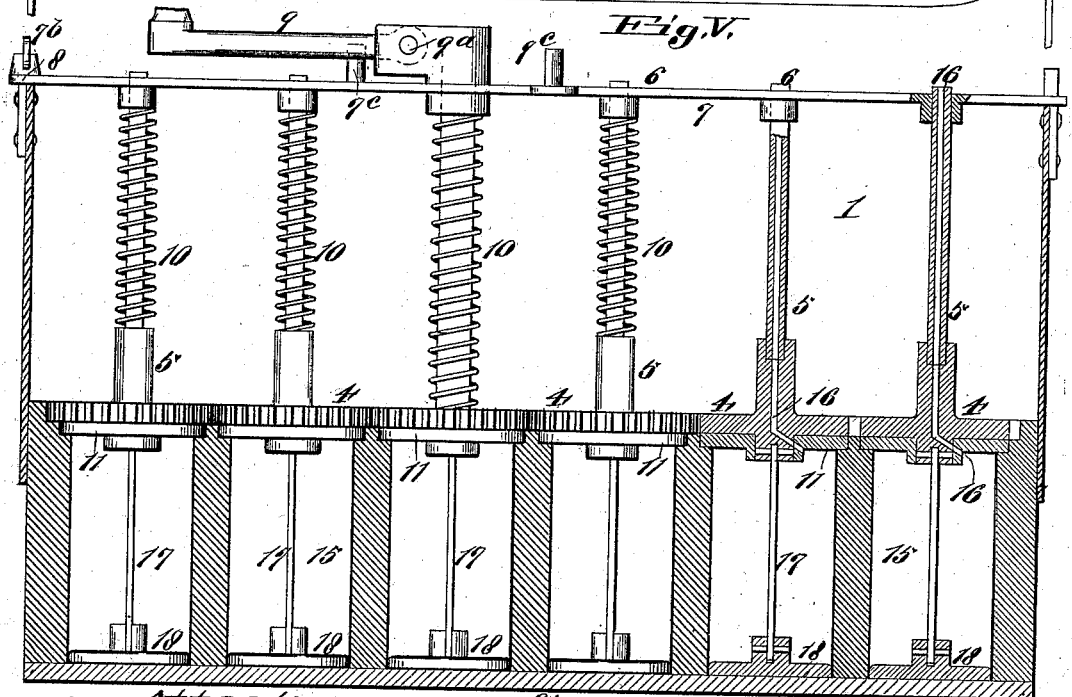
Fig. V.
Attest:
A. M. Ebersole
Benj. A. Knight
Inventor:
George Roth
By Knight Bros.
Atty's

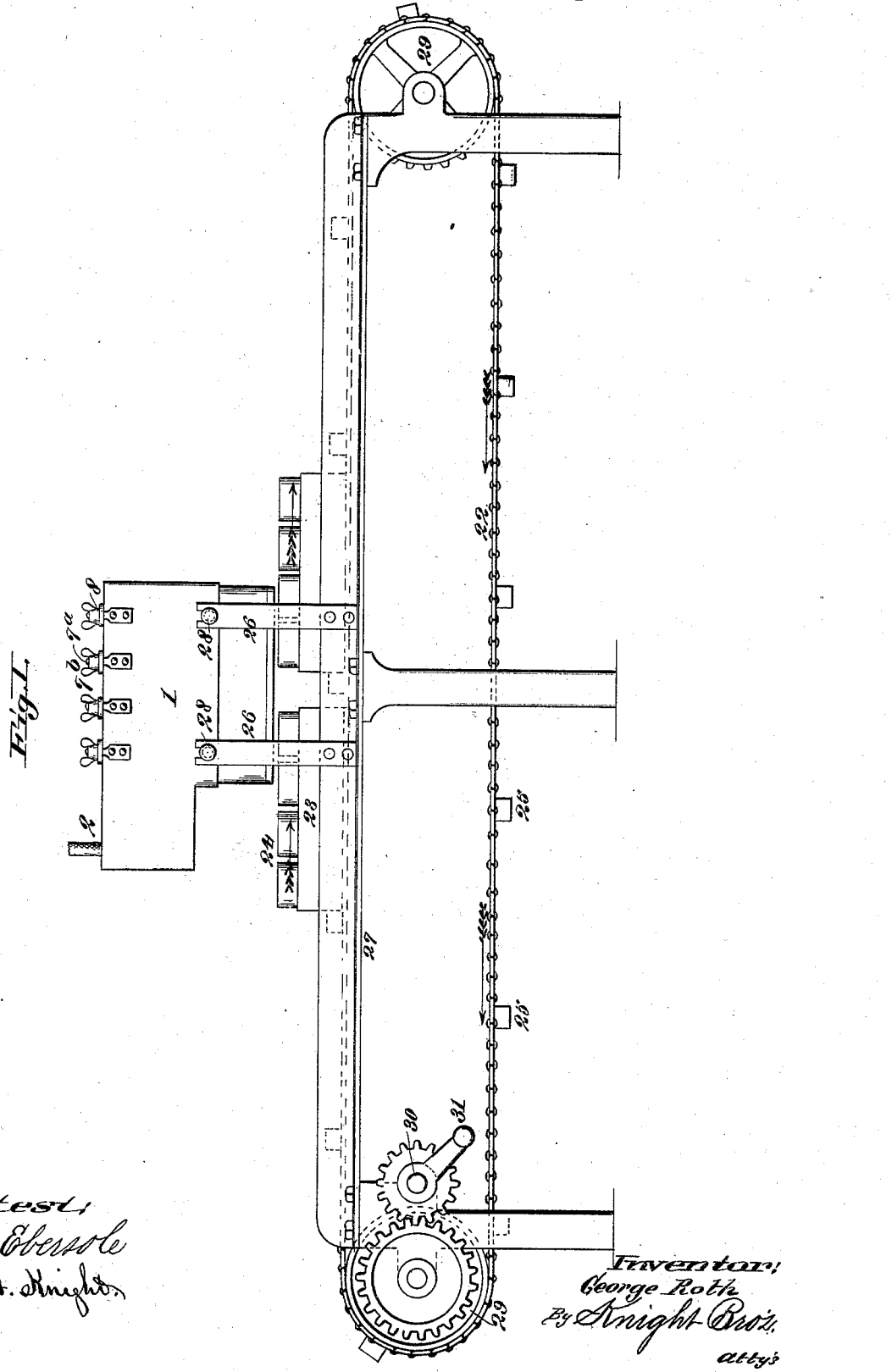

UNITED STATES PATENT OFFICE.

GEORGE ROTH, OF HIGHLAND, ILLINOIS.

CAN-FILLING MACHINE.

SPECIFICATION forming part of Letters Patent No. 505,005, dated September 12, 1893.

Application filed May 25, 1893. Serial No. 475,412. (No model.)

*To all whom it may concern:*

Be it known that I, GEORGE ROTH, of Highland, in the county of Madison and State of Illinois, have invented a certain new and useful Improvement in Can-Filling Machines, of which the following is a full, clear, and exact description, reference being had to the accompanying drawings, forming part of this specification.

My invention relates to certain improvements in machines for filling cans, and is more particularly intended for filling cans with milk; and my invention consists in features of novelty hereinafter fully described and pointed out in the claims.

Figure I is a side elevation, illustrative of my invention. Fig. II is part in end view, and part in section, on line II—II, Fig. III. Fig. III is an enlarged, detail elevation, part in section. Fig. IV is part in top view, and part in horizontal section. Fig. V is a vertical section, taken on line V—V, Fig. IV.

Referring to the drawings, 1 represents a tank into which the milk is discharged through a pipe or hose 2, provided with a valve $2^a$ having a float $2^b$ by which the valve is closed automatically, when the tank is filled to a certain height.

In the bottom of the tank is a series of gear-wheel valves 4, meshing with each other, as shown in Figs. IV and V. These valves have upwardly extending stems 5, the upper ends of which have bearings in strips 7 secured to the top of the tank by means of bolts $7^a$ having thumb nuts $7^b$, as shown at 8. To one of the stems is secured or fitted a crank 9, by which all of the stems, with their valves, are turned.

10 represent suitable springs surrounding the stems 5, and which serve to keep the valves in their lower position. Beneath each valve is a disk 11, held from turning with the valve by any suitable means. I have shown it held by means of a pin 12, fitting in a recess in the disk, and in the upper end of the cylinders, which receive the milk from the tank. Each valve is provided with a port or passage 13, which is adapted to register with a port or passage 14 in the disk 11 beneath. The disks 11 form the upper heads or caps of the cylinders 15 located beneath the tank 1. There is a cylinder 15 for each disk 11, and consequently for each valve 4. It will be seen that when the gear wheels are turned by the crank 9 until the ports 13 register with the ports 14, the milk will pass from the tank 1 into the cylinders 15, and as the milk passes into the cylinders, the air escapes through the hollow stems 5 which communicate by a port 16 with the tops of the cylinders. Each valve 4 is connected by a rod or bar 17, with a disk 18, the disks 18 being located at the bottom of the cylinders 15; these disks 18 have ports or passages 19, (see Fig. III,) which are adapted to register with ports or passages 20 in the bottom 21 of the cylinders 15. While the ports 13 are registered with the ports 14, the ports 19 are not registered with the ports 20, and vice versa.

22 represents traveling belts adapted to support trays 23 for holding the cans 24 to be filled. The trays are held from shifting on the belts by means of brackets 25. The tank 1 and cylinders 15 are supported a short distance above the belts 22, preferably by means of standards 26 secured to the frame or table 27, over which the belts pass. The standards have notched, upper ends to receive projections 28 on the sides of the tank. The belts 22 pass over drums 29 at the ends of the frame or table 27, and one of these drums is geared with a shaft 30 provided with a turning crank 31, (see Fig. I.)

The operation is as follows:—The cans are placed in the tray, and the tray moved by the belts 22 until the cans are under openings 20 in the bottom of the cylinders. The crank 9 is then turned to admit milk from the tank 1 into the cylinders 15. As soon as the cylinders are full, the crank is turned again, shutting off communication between the tank and cylinders, and opening communication between the cylinders and the cans, so that the milk passes from the cylinders into the cans beneath. Each cylinder holds sufficient milk for one can, and no more, and by this arrangement, the cans are automatically filled with just the proper amount of milk, and without danger of milk getting on the outer surface of the can around the filling opening, which is a thing to be avoided, if possible. The crank 9 is jointed at $9^a$, and one of the strips 7 has two pins $7^c$, which serve to stop the crank on a half rotation. One of the pins stops the crank when the ports 13 register with the ports 14, and the other pin stops the crank when the ports 19 register with the ports. 20. By raising the crank on its hinge, it passes the pins. It will be seen that the valves 4, with their stems 5 and springs 10, as well as the disks 11 and 18 with their connecting bars 17, can be easily removed to be cleansed.

I claim as my invention—

1. In a can filling machine, the combination of a tank, valves located at the bottom of the tank, and provided with stems by which they may be turned, cylinders located beneath the tank, stationary disks on top of the cylinders beneath said valves, and which have ports adapted to register with ports in the valves, disks located at the bottoms of the cylinders, and connected to said valves, and which have ports adapted to register with ports in the bottoms of the cylinders, and means for moving the cans beneath said cylinders; substantially as and for the purpose set forth.

2. In a can filling machine, the combination of a tank, valves located at the bottom of the tank and provided with stems by which they may be turned, cylinders located beneath the tank, stationary disks on top of the cylinders beneath said valves, and which have ports adapted to register with ports in the valves, disks located at the bottoms of the cylinders, and connected to said valves and which have ports adapted to register with ports in the bottoms of the cylinders, means for moving the cans beneath said cylinders, and a crank on the stem of one of the valves; said valves being geared together, substantially as and for the purpose set forth.

3. In a can filling machine, the combination of a tank, valves located in the bottom of the tank and provided with stems by which they may be turned, and having teeth on their peripheries meshing into each other, cylinders located beneath the tank, stationary disks on top of the cylinders beneath said valves, and which have ports adapted to register with ports in the valves, disks located at the bottoms of the cylinders and connected to said valves, and which have ports adapted to register with ports in the bottoms of the cylinders, and means for moving the cans beneath said cylinders; substantially as and for the purpose set forth.

4. In a can filling machine, the combination of a tank, valves located at the bottom of the tank, and provided with stems by which they may be turned, and having teeth meshing into each other, a hinged crank on one of said valve stems, stop pins 7° adapted to be engaged by said crank, cylinders located beneath the tank, stationary disks on top of the cylinders beneath said valves, and which have ports adapted to register with ports in the valves, disks located at the bottoms of the cylinders, and connected with said valves, and which have ports adapted to register with ports in the bottoms of the cylinders, and means for moving the cans beneath said cylinders; substantially as and for the purpose set forth.

5. In a can filling machine, the combination of a tank, valves located at the bottom of the tank and provided with hollow stems by which they may be turned, cylinders located beneath the tank, and communicating with said hollow stems through ports 16, stationary disks on top of the cylinders beneath said valves, and which have ports adapted to register with ports in the valves, disks located in the bottoms of the cylinders and connected to said valves by bars 17, and which have ports adapted to register with ports in the bottoms of the cylinders, and means for moving the cans beneath said cylinders; substantially as and for the purpose set forth.

GEORGE ROTH.

In presence of—
ALBERT M. EBERSOLE,
E. S. KNIGHT.